6428X
G. Shetter,
Wood Auger.
Patented Mar. 21, 1831.
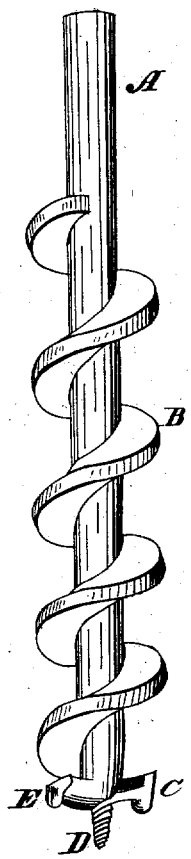

4 6428x Mar. 21, 1831 2514

George Shetter A. Citizen of the United States. Letters Patent.
The Schedule referred to in these Letters Patent & making part of the
same, containing a description in the words of the said George
Shetter himself of his improvement in the "Serpentine Screw Auger."

Be it known that I George Shetter, of the Borough of York, in the
County of York & State of Pennsylvania, have invented a new &
useful improvement in the Auger, called the "Serpentine Screw
Auger" and that the following is a full and exact description
of the said Auger as invented by me.

This Auger differs from the common Auger and also from
the Serpentine Screw Auger, invented by me & Patented September 10th
A.D. 1829. in as much as it has a double bit, and the former has a
single bit; the shaft or Stem A. and Spiral or B, winding in a
serpentine manner, the nib or bit C. and common screw D. are the
same as in the original; the difference is in the additional bit E.
which makes this Auger far superior, in as much as it bores steadier, easier & cuts through much better than the former.

Witnesses
Alex Demuth
Chas. A. Fisher

George Shetter.

(23 words) Patented March 21, 1831. -
Rec'd & Recorded anew

Drawing.